US012572064B2

(12) United States Patent
Shimada et al.

(10) Patent No.: US 12,572,064 B2
(45) Date of Patent: Mar. 10, 2026

(54) OPTICAL ARTICLE AND METHOD FOR PRODUCING OPTICAL ARTICLE

(71) Applicant: HOYA LENS THAILAND LTD., Pathumthani (TH)

(72) Inventors: Takuya Shimada, Tokyo (JP); Kei Kobayashi, Tokyo (JP); Teruo Yamashita, Tokyo (JP); Tsuyoshi Watanabe, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 1018 days.

(21) Appl. No.: 17/705,659

(22) Filed: Mar. 28, 2022

(65) Prior Publication Data

US 2022/0221782 A1 Jul. 14, 2022

Related U.S. Application Data

(63) Continuation of application No. PCT/JP2020/047322, filed on Dec. 18, 2020.

(30) Foreign Application Priority Data

Dec. 27, 2019 (JP) ................................ 2019-239794

(51) Int. Cl.

*G03C 1/73* (2006.01)
*C08F 16/18* (2006.01)
*C08F 20/06* (2006.01)
*C08F 20/14* (2006.01)
*C08K 5/16* (2006.01)
*C09K 9/02* (2006.01)
*G02B 1/04* (2006.01)
*G02C 7/10* (2006.01)

(52) U.S. Cl.

CPC .............. *G03C 1/733* (2013.01); *C08F 16/18* (2013.01); *C08F 20/06* (2013.01); *C08F 20/14* (2013.01); *C08K 5/16* (2013.01); *C09K 9/02* (2013.01); *G02B 1/041* (2013.01); *G02C 7/102* (2013.01); *G02C 7/104* (2013.01)

(58) Field of Classification Search

None

See application file for complete search history.

(56) References Cited

U.S. PATENT DOCUMENTS

2011/0279883 A1 11/2011 Kumar et al.
2017/0153464 A1 6/2017 Tamura et al.
2017/0323936 A1 11/2017 Lee et al.
2018/0251657 A1 9/2018 Yamamoto et al.
2018/0290408 A1 10/2018 Park et al.
2020/0142220 A1 5/2020 Shimada et al.

FOREIGN PATENT DOCUMENTS

CN 101479631 A 7/2009
CN 106414647 A 2/2017
CN 108026241 A 5/2018
CN 114423840 A 4/2022
EP 3 795 602 A1 3/2021
JP H07-157531 A 6/1995
JP 2012-104497 A 5/2012
JP 2012-230913 A 11/2012
JP 2014-523541 A 9/2014
JP 2014-219492 A 11/2014
JP 2018-200787 A 12/2018
JP 2018-537707 A 12/2018
WO 2003/011967 A1 2/2003
WO 2012/170287 A1 12/2012
WO 2013/157285 A1 10/2013
WO 2015/016313 A1 2/2015
WO 2017/039019 A1 3/2017
WO 2017/074444 A1 5/2017
WO 2019/189855 A1 10/2019
WO WO-2021053089 A1 * 3/2021 ............... G02C 7/02

OTHER PUBLICATIONS

Mar. 2, 2021 International Search Report issued in International Patent Application No. PCT/JP2020/047322.
Mar. 2, 2021 Written Opinion issued in International Patent Application No. PCT/JP2020/047322.
Feb. 7, 2023 Office Action issued in Japanese Patent Application No. 2021-567380.
Dec. 20, 2023 Extended European Search Report issued in European Patent Application No. 20905979.9.
Mar. 30, 2024 Office Action Issued in Chinese Patent Application No. 202080073191.8.

* cited by examiner

*Primary Examiner* — Jeffrey D Washville
(74) *Attorney, Agent, or Firm* — Oliff PLC

(57) ABSTRACT

Provided is an optical article having a substrate, a primer layer generated by curing a polymerizable composition for forming the primer layer, and a photochromic layer containing a photochromic compound in this order, in which the polymerizable composition for forming the primer layer contains a component A: a polyisocyanate, a component B: a hydroxy group-containing polymerizable compound, and a component C: a polymerizable compound having a viscosity of 100 cP or less and being selected from the group consisting of (meth)acrylates and vinyl ethers.

7 Claims, No Drawings

OPTICAL ARTICLE AND METHOD FOR PRODUCING OPTICAL ARTICLE

CROSS-REFERENCE TO RELATED APPLICATIONS

This application is a Continuation of PCT International Application No. PCT/JP2020/047322 filed on Dec. 18, 2020, which was published under PCT Article 21(2) in Japanese and claims priority under 35 U.S.C. § 119(a) to Japanese Patent Application No. 2019-239794 filed on Dec. 27, 2019. Each of the above applications is hereby expressly incorporated by reference, in its entirety, into the present application.

TECHNICAL FIELD

The present disclosure relates to an optical article.

BACKGROUND ART

A photochromic compound is a compound having a property of coloring upon irradiation with light in a wavelength range where the photochromic compound has optical responsivity and fading in the absence of irradiation (photochromic properties). Hereinafter, an article containing a photochromic compound will be referred to as a photochromic article. For example, PTL 1 discloses an optical article having a layer containing a photochromic compound (photochromic layer) provided on a substrate.

CITATION LIST

Patent Literature

[PTL 1] WO 2003/011967

SUMMARY

With the intention of improving the performance of an optical article having a photochromic layer, the present inventors repeated studies to enhance the optical homogeneity.

That is, one aspect of the present disclosure provides for an optical article having a photochromic layer and having excellent optical properties.

One aspect of the present disclosure relates to
an optical article having
a substrate,
a primer layer generated by curing a polymerizable composition for forming the primer layer, and
a photochromic layer containing a photochromic compound
in this order,
in which the polymerizable composition for forming the primer layer contains
a component A: a polyisocyanate,
a component B: a hydroxy group-containing polymerizable compound, and
a component C: a polymerizable compound having a viscosity of 100 cP or less and being selected from the group consisting of (meth)acrylates and vinyl ethers.

In the optical article having the photochromic layer on the substrate, the primer layer may be provided between the substrate and the photochromic layer in order to improve the adhesive property between the substrate and the photochromic layer. Therefore, as a result of studying the primer layer provided between the substrate and the photochromic layer, the present inventors clarified that the deterioration of the optical properties attributed to the primer layer may occur. Therefore, as a result of further repeating intensive studies, the present inventors newly found that, when the polymerizable composition for forming the primer layer contains not only the component A and the component B but also the component C, the generation of an optical defect attributed to the primer layer can be suppressed, which makes it possible to provide an optical article having excellent optical properties.

According to one aspect of the present disclosure, it is possible to provide an optical article having a photochromic layer and having excellent optical properties.

DESCRIPTION OF EMBODIMENTS

[Optical Article]

Hereinafter, an optical article according to one aspect of the present disclosure will be described in greater detail.

The optical article has a substrate, a primer layer and a photochromic layer in this order.

<Substrate>

The optical article may have the photochromic layer on a substrate selected depending on the type of the optical article through the primer layer. As an example of the substrate, a spectacle lens substrate may be a plastic lens substrate or a glass lens substrate. The glass lens substrate may be, for example, a lens substrate made of inorganic glass. In terms of being lightweight, difficult to break and easy to handle, the lens substrate may be a plastic lens substrate. The plastic lens substrate may be, for example, a styrene resin (e.g. a (meth)acrylic resin), a polycarbonate resin, an allyl resin, an allyl carbonate resin (e.g. a di(ethylene glycol) bis(allyl carbonate) resin (CR-39)), a vinyl resin, a polyester resin, a polyether resin, a urethane resin generated by the reaction of an isocyanate compound and a hydroxy compound (e.g. diethylene glycol), a thiourethane resin generated by the reaction of an isocyanate compound and a polythiol compound, or a cured material (normally called a transparent resin) generated by curing a curable composition containing a (thio)epoxy compound having at least one disulfide bond in one molecule. The lens substrate may not be colored (colorless lens) or may be colored (colored lens). The refractive index of the lens substrate may be, for example, about 1.60 to 1.75. However, the refractive index of the lens substrate is not limited to the above range and may be within the above range or may be above or below the above range. In the present disclosure and the present specification, the refractive index refers to a refractive index with respect to light having a 500 nm wavelength. Further, the lens substrate may be a lens having index (prescription lens) or may be a lens having no index (flat lens).

The spectacle lens can be various lenses including a mono-focal lens, a multi-focal lens and a progressive index lens. The type of the lens is determined by the surface shape of both sides of the lens substrate. Further, the surface of the lens substrate may be any one of a convex surface, a concave surface and a flat surface. In general lens substrates and spectacle lenses, the surface on the object side is a convex surface, and the surface on the eyeball side is a concave surface. However, the present disclosure is not limited to this. The photochromic layer can be, generally, located on the object-side surface of the lens substrate, but may also be located on the eyeball-side surface.

<Primer Layer>

The primer layer is a cured layer generated by curing a polymerizable composition for forming the primer layer containing a component A, a component B and a component C. In the present disclosure and the present specification, a polymerizable composition refers to a composition containing a polymerizable compound. The polymerizable compound is a compound having a property of a polymerizable group.

(Component A)

The component A is a polyisocyanate. The polyisocyanate is a compound having two or more isocyanate groups in one molecule. The number of the isocyanate groups contained in one molecule of the polyisocyanate is 2 or more and may be 3 or more. Further, the number of the isocyanate groups contained in one molecule of the polyisocyanate may be, for example, 6 or less, 5 or less or 4 or less. The molecular weight of the polyisocyanate may be, for example, within a range of 100 to 500, but is not limited to this range. Specific examples of the polyisocyanate include aromatic diisocyanates such as xylylene diisocyanate, phenylene diisocyanate, tolylene diisocyanate, diphenylmethane diisocyanate and naphthalene diisocyanate, aliphatic or alicyclic diisocyanates such as hexamethylene diisocyanate, lysine diisocyanate, cyclohexane diisocyanate, isophorone diisocyanate, 4,4'-dicyclohexylmethane diisocyanate, 1,3-bisisocyanatomethylcyclohexane, tetramethylxylylene diisocyanate, and the like. Further, the specific examples also include allophanate bodies, adduct bodies, biuret bodies, isocyanurate bodies and the like of the polyisocyanates exemplified above. Examples of the commercially available products of the polyisocyanate include CORONATE HX, CORONATE HXR, CORONATE HXLV, CORONATE HK, CORONATE 2715, CORONATE HL, CORONATE L, CORONATE 2037, HDI, TDI, MDI (manufactured by Tosoh Corporation), TAKENATE 500, TAKENATE 600, DURANATE 24A-100, TPA-100, TKA-100, P301-75E, TAKENATE D-110N, D-120N, D-127N, D-140N, D-160N, D15N, D-170N, D-170HN, D-172N, D-177N, D-178N, D-101E (manufactured by Mitsui Chemicals, Inc.), and the like.

(Component B)

The component B is a hydroxy group-containing polymerizable composition. The number of the hydroxy groups contained in one molecule of the component B is 1 or more and may be 2 or more. Further, the number of the hydroxy groups contained in one molecule of the component B may be 4 or less or 3 or less. A urethane bond can be formed by reacting the isocyanate group in the component A and the hydroxy group in the component B. The present inventors presume that this urethan bond contributes to the fact that the primer layer is capable of functioning as a layer for improving the adhesive property.

The component B is a polymerizable compound and may have one or more polymerizable groups and may have two or more polymerizable groups in one molecule. In one form, the component B may be a (meth)acrylate. In the present disclosure and the present specification, "(meth)acrylate" is used to encompass acrylate and methacrylate. "Acrylate" is a compound having one or more acryloyl groups in one molecule. "Methacrylate" is a compound having one or more methacryloyl groups in one molecule. For (meth) acrylates, the number of functional groups is the number of groups selected from the group consisting of an acryloyl group and a methacryloyl group contained in one molecule. In the present disclosure and the present specification, "methacrylate" refers to a substance containing only a methacryloyl group as the (meth)acryloyl group, and a substance containing both a methacryloyl group and an acryloyl group as the (meth)acryloyl group will be referred to as an acrylate. The acryloyl group may be contained in a form of an acryloyloxy group, and the methacryloyl group may be contained in a form of a methacryloyloxy group. "(Meth)acryloyl group" in the following description is used to encompass both an acryloyl group and a methacryloyl group, and "(meth)acryloyloxy group" is used to encompass both an acryloyloxy group and a methacryloyloxy group. Further, unless particularly otherwise described, groups to be described below may have a substituent or may have no substituent. In a case where a certain group has a substituent, the substituent may be, for example, an alkyl group (for example, an alkyl group having 1 to 6 carbon atoms), a hydroxyl group, an alkoxy group (for example, an alkoxy group having 1 to 6 carbon atoms), a halogen atom (for example, a fluorine atom, a chlorine atom or a bromine atom), a cyano group, an amino group, a nitro group, an acyl group, a carboxy group or the like. Further, for groups having a substituent, "the number of carbon atoms" means the number of carbon atoms in a portion containing no substituent.

In a case where the component B is a (meth)acrylate, the number of functional groups in the (meth)acrylate is 1 or more (that is, monofunctional or higher) and may be 2 or more. Further, the number of functional groups may be 3 or less. As the (meth)acryloyl group, the component B may contain only an acryloyl group, may contain only a methacryloyl group or may contain an acryloyl group and a methacryloyl group. In one form, the component B may contain only an acryloyl group as the (meth)acryloyl group. The molecular weight of the component B may be, for example, within a range of 300 to 400, but is not limited to this range. Specific examples of the component B include 2-hydroxyethyl (meth)acrylate, hydroxypropyl (meth)acrylate, 4-hydroxybutyl (meth)acrylate, 1,4-cyclohexanedimethanol monoacrylate, 2-hydroxy-1-acryloxy-3-methodoroxypropane, 2-hydroxy 1-3 dimethacryloxypropane, pentaerythritol tetraacrylate, 2-hydroxy-3-phenoxypropyl acrylate, monoacryloxyethyl hexahydrophthalate, 2-acryloyloxyethyl phthalate, 2-(acryloyloxy) ethyl 2-hydroxyethyl phthalate and the like. Further, in one form, the component B may have an amide group. Specific examples of the component B having an amide group include N-(2-hydroxyethyl)acrylamide and the like. Further, the component B may have an epoxy ester structure in one form. The epoxy ester structure is a structure generated by a rection between an epoxy group and a carboxy group and can be represented by "$—CH(OH)—CH_2—O—C(=O)—$". Examples of the commercially available products of the component B having the epoxy ester structure include EPOXY ESTER 40EM (manufactured by Kyoeisha Chemical Co., Ltd.), EPOXY ESTER 70PA (manufactured by Kyoeisha Chemical Co., Ltd.), EPOXY ESTER 80MFA (manufactured by Kyoeisha Chemical Co., Ltd.), EPOXY ESTER 200PA (manufactured by Kyoeisha Chemical Co., Ltd.), EPOXY ESTER 3002M (N) (manufactured by Kyoeisha Chemical Co., Ltd.), EPOXY ESTER 3002A (N) (manufactured by Kyoeisha Chemical Co., Ltd.), EPOXY ESTER 3000MK (manufactured by Kyoeisha Chemical Co., Ltd.), EPOXY ESTER 3000A (manufactured by Kyoeisha Chemical Co., Ltd.) and the like.

(Component C)

The component C is a polymerizable compound having a viscosity of 100 cP (centipoise) or less and being selected from the group consisting of (meth)acrylates and vinyl ethers. The present inventors presume that the fact that a polymerizable compound having a low viscosity as described above is contained contributes to suppression of the generation of an optical defect in the primer layer formed of the polymerizable composition for forming the primer layer containing the component A and the component B. In the present disclosure and the present specification, "viscosity" is a value measured with a vibration-type viscometer in the atmosphere of a temperature of 25° C. The viscosity of the component C is 100 cP or less, may be 70 cP or less or 50 cP or less. Further, the viscosity of the component C may be, for example, 5 cP or more or 10 cP or more. The (meth)acrylate, which is one form of the component C, may be mono to trifunctional and may be mono or bifunctional. Further, the (meth)acrylate, which is one form of the component C, may contain an aryl group (for example, a phenyl group), an amide group or the like. In the present disclosure and the present specification, "vinyl ether" is a compound having one or more vinyl groups and one or more ether bonds in one molecule and may have two or more vinyl groups and may have two to four vinyl groups in one molecule. Further, the number of the ether bonds contained in the vinyl ether may be 2 to 4 in one molecule. The molecular weight of the component C may be, for example, within a range of 150 to 250, but is not limited to this range. Specific examples of the component C may include 2-phenoxyethyl (meth)acrylate, acrylamide, methoxy polyethylene glycol (meth)acrylate, phenoxypolyethylene glycol (meth)acrylate, stearyl (meth)acrylate, 1,10-decanediol di(meth)acrylate, 1,6-hexanediol di(meth)acrylate, 1,9-nonanediol di(meth)acrylate, dipropylene glycol di(meth) acrylate, tripropylene glycol di(meth)acrylate, polypropylene glycol di(meth)acrylate, phenoxyethyl (meth)acrylate, ethylene glycol di(meth)acrylate, diethylene glycol di(meth) acrylate, triethylene glycol di(meth)acrylate, tricyclodecanedimethanol di(meth)acrylate, ethoxylated polypropylene glycol di(meth)acrylate, trimethylolpropane tri(meth) acrylate, ethyl (meth)acrylate, butyl (meth)acrylate, isobutyl (meth)acrylate, tert-butyl (meth)acrylate, 2-ethylhexyl (meth)acrylate, isodecyl (meth)acrylate, dodecyl (meta) acrylate, tridecyl (meth)acrylate, diethylene glycol butyl ether (meth)acrylate, cyclohexyl (meth)acrylate, tetrahydrofurfuryl (meth)acrylate, benzyl (meth)acrylate, 2-phenoxyethyl methacrylate, isobornyl (meth)acrylate, 2-(dimethylamino)ethyl (meth)acrylate, 2-(diethylamino)ethyl (meth) acrylate, glycidyl (meth)acrylate, ethylene glycol di(meth) acrylate, diethylene glycol di(meth)acrylate, triethylene glycol di(meta)acrylate, polyethylene glycol di(meth)acrylate, tetramethylene glycol di(meth)acrylate, neopentyl glycol di(meth)acrylate, hexanediol di(meth)acrylate, nonamethylene glycol di(meth)acrylate, isoamyl (meth)acrylate, ethylene glycol monovinyl ether, tetramethylene glycol monovinyl ether, diethylene glycol monovinyl ether, 2-ethylhexyl vinyl ether, 2-propenoic acid, 2-[2-(ethenyloxy) ethoxy]ethyl ester, 2-(2-ethenoxyethoxy)ethyl 2-methylprop-2-enoate and the like.

In the polymerizable composition for forming the primer layer, when the total of the component A, the component B and the component C is regarded as 100% by mass, the content rate of the component C may be 30.0% by mass or more or 40.0% by mass or more. When the total of the component A, the component B and the component C is regarded as 100% by mass, the content rate of the component C may be, for example, 90.0% by mass or less, 80.0% by mass or less or 70.0% by mass or less. The polymerizable composition for forming the primer layer may contain only one component C in one form or may contain two or more components C in another form. In a case where two or more components C are contained, the content rate of the component C is the total content rate of the two or more components C. This is also true for the content rates of other components. In one form, the component C may be, among the component A, the component B and the component C, a component having the largest fraction in the polymerizable composition for forming the primer layer.

In the polymerizable composition for forming the primer layer, when the total of the component A, the component B and the component C is regarded as 100% by mass, the content rate of the component A may be 70.0% by mass or less, 60.0% by mass or less or 50.0% by mass or less. When the total of the component A, the component B and the component C is regarded as 100% by mass, the content rate of the component A may be, for example, 10.0% by mass or more, 20.0% by mass or more or 30.0% by mass or more.

In the polymerizable composition for forming the primer layer, when the total of the component A, the component B and the component C is regarded as 100% by mass, the content rate of the component A may be 3.0% by mass or more, 5.0% by mass or more or 7.0% by mass or more. When the total of the component A, the component B and the component C is regarded as 100% by mass, the content rate of the component B may be, for example, 30.0% by mass or less or 20.0% by mass or less.

The polymerizable composition for forming the primer layer may further contain a polymerization initiator. When the total of the component A, the component B and the component C is regarded as 100% by mass, the polymerizable composition for forming the primer layer may contain the polymerization initiator in a content rate, for example, within a range of 0.01 to 3.0% by mass.

As the polymerization initiator, known polymerization initiators can be used, a radical polymerization initiator can be used, and only a radical polymerization initiator can be contained as the polymerization initiator. Further, as the polymerization initiator, a photopolymerization initiator or a thermopolymerization initiator can be used, and a photopolymerization initiator can be used from the viewpoint of progressing a polymerization reaction within a short period of time. Examples of the photoradical polymerization initiator include benzoin ketals such as 2,2-dimethoxy-1,2-diphenylethan-1-one; α-hydroxyketones such as 1-hydroxycyclohexyl phenyl ketone, 2-hydroxy-2-methyl-1-phenylpropan-1-one and 1-[4-(2-hydroxyethoxy)phenyl]-2-hydroxy-2-methyl-1-propan-1-one; α-aminoketones such as 2-benzyl-2-dimethylamino-1-(4-morpholinophenyl)-butan-1-one and 1,2-methyl-1-[4-(methylthio)phenyl]-2-morpholinopropan-1-one; oxime esters such as 1-[(4-phenylthio)phenyl]-1,2-octadion-2-(benzoyl) oxime; phosphine oxides such as bis(2,4,6-trimethylbenzoyl)phenylphosphine oxide, bis(2,6-dimethoxybenzoyl)-2,4,4-trimethylpentylphosphine oxide and 2,4,6-trimethylbenzoyldiphenylphosphine oxide; 2,4,5-triarylimidazole dimers such as 2-(o-chlorophenyl)-4,5-diphenylimidazole dimer, 2-(o-chlorophenyl)-4,5-di(methoxyphenyl)imidazole dimer, 2-(o-fluorophenyl)-4,5-diphenylimidazole dimer, 2-(o-methoxyphenyl)-4,5-diphenylimidazole dimer and 2-(p-methoxyphenyl)-4,5-diphenylimidazole dimer; benzophenone compounds such as benzophenone, N,N'-tetramethyl-4,4'-diaminobenzophenone, N,N'-tetraethyl-4,4'-diaminobenzophenone and 4-methoxy-4'-dimethylaminobenzophenone; quinone compounds such as 2-ethyl anthraquinone, phenanthrenequinone, 2-tert-butylanthraquinone, octamethylanthraquinone, 1,2-benzanthraquinone, 2,3-benzanthraquinone, 2-phenylanthraquinone, 2,3-diphenyl anthraquinone, 1-chloroanthraquinone, 2-methylanthraquinone, 1,4-naphthoquinone, 9,10-phenanthraquinone, 2-methyl-1,4-naphthoquinone and 2,3-dimethylanthraquinone; benzoin ethers such as benzoin methyl ether, benzoin ethyl ether and benzoin phenyl ether; benzoin compounds such as benzoin, methylbenzoin and ethylbenzoin; benzyl compounds such as benzyl dimethyl ketal; acridine compounds such as 9-phenylacridine and 1,7-bis(9,9'-acridinyl-heptane): N-phenylglycine, coumarin and the like. Further, in the 2,4,5-triarylimidazole dimer, as substituents for the aryl groups in two triarylimidazole portions, identical and symmetric compounds may be imparted or different and asymmetric compound may be imparted. Further, a thioxanthone compound and a tertiary amine may be combined like a combination of diethylthioxanthone and dimethylaminobenzoic acid. Among these, α-hydroxyketones and phosphine oxides may be used from the viewpoint of curing properties, transparency and heat resistance.

The polymerizable composition for forming the primer layer may or may not contain a solvent. In a case where a solvent is contained, as a usable solvent, any solvent can be used in any amount as long as the progress of the polymerization reaction of the polymerizable composition is not impaired. In a case where the solvent is contained, when the total of the component A, the component B and the component C is regarded as 100% by mass, the content rate of the solvent may be 10.0% by mass or less, 5.0% by mass or less or 3.0% by mass or less.

The polymerizable composition for forming the primer layer may further contain a known additive that may be generally added to compositions for forming a primer layer in any amount. As the additive, a known compound can be used. When the total amount of the polymerizable composition for forming the primer layer (here, the polymerization initiator is excluded) is regarded as 100% by mass, the composition may contain the component A, the component B and the component C in a total of 80.0% by mass or more, 85.0% by mass or more, 90.0% by mass or more or 95.0% by mass or more. Further, in the polymerizable composition for forming the primer layer, when the total amount of the composition (here, the polymerization initiator is excluded) is regarded as 100% by mass, the total content rate of the component A, the component B and the component C may be, for example, 100% by mass, 100% by mass or less, less than 100% by mass, 99.0% by mass or less or 98.0% by mass or less. In the present disclosure and the present specification, regarding the content rate, for a composition containing a solvent, "the total amount of the composition" refers to the total amount of all components excluding the solvent.

The composition for forming the primer layer can be prepared by mixing the above-described various components at the same time or sequentially in any order.

The polymerizable composition for forming the primer layer is applied to the substrate, and a curing treatment is performed on the applied composition, whereby a primer layer, which is a cured layer generated by curing the polymerizable composition for forming the primer layer, can be formed on the substrate. As an application method, a known application method such as a spin coating method or a dipping method can be adopted, and a spin coating method can be adopted from the viewpoint of the uniformity of the application. In order for the cleaning or the like of the surface of the substrate, one or more of any known pretreatments such as an alkali treatment and a UV ozone treatment can be performed on the surface of the substrate before the application. The curing treatment may be light irradiation and/or a heating treatment and the curing treatment may be light irradiation from the viewpoint of progressing a curing reaction within a short period of time. The conditions for the curing treatment may be determined depending on the types of various components contained in the polymerizable composition for forming the primer layer or the composition of the polymerizable composition for forming the primer layer. After the curing treatment, an annealing treatment (heating treatment) can also be performed as necessary. The annealing treatment can be performed in, for example, a heat treatment furnace at an atmospheric temperature of about 90° C. to 130° C.

The thickness of the primer layer may be, for example, 3 μm or more or 5 μm or more. Further, the thickness of the primer layer may be, for example, 15 μm or less or 10 μm or less.

<Photochromic Layer>

(Polymerizable Compound)

The optical article has a photochromic layer on the primer layer. In one form, the photochromic layer may be a cured layer generated by curing a (meth)acrylate-based polymerizable composition. In the present disclosure and the present specification, "(meth)acrylate-based polymerizable composition" refers to a polymerizable composition containing a (meth)acrylate. In a case where the polymerizable composition for forming the primer layer is a (meth)acrylate-based polymerizable composition, the present inventors presume that the fact that the composition for forming the photochromic layer may also be a (meth)acrylate-based polymerizable composition from the viewpoint of further improving the adhesive property between the primer layer and the photochromic layer.

Hereinafter, a (meth)acrylate-based polymerizable composition, which is one form of a polymerizable composition for forming the photochromic layer, will be described. Here, the following form is merely an example, and the present disclosure is not limited only to such an example.

The polymerizable composition for forming the photochromic layer may contain the component C in one form.

Further, in one form, the polymerizable composition for forming the photochromic layer may contain the following component D.

The component D is an acyclic methacrylate having a molecular weight of 500 or more. In the present disclosure and the present description, "acyclic" means that no cyclic structures are included. In contrast, "cyclic" means that a cyclic structure is included. The acyclic methacrylate refers to a mono- or higher functional methacrylate including no cyclic structures.

The component D may be a mono- or higher functional methacrylate and may be a bi- or trifunctional methacrylate and may be a bifunctional methacrylate. The component D may be polyalkylene glycol dimethacrylate. The polyalkylene glycol dimethacrylate can be represented by the following formula 1:

(Formula 1)

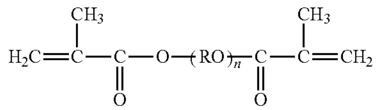

R represents an alkylene group, n indicates the number of times of repetition of an alkoxy group represented by RO and is 2 or more. Examples of the alkylene group represented by R include an ethyl group, a propylene group, a tetramethylene group, and the like. n is 2 or more and may be, for example, 30 or less, 25 or less or 20 or less. Specific examples of the polyalkylene glycol dimethacrylate may include polyethylene glycol dimethacrylate, polypropylene glycol dimethacrylate, polytetramethylene glycol dimethacrylate and the like.

The molecular weight of the component D is 500 or more. In the present disclosure and the present specification, as the molecular weights of polymers, a structural formula determined by a structural analysis of a compound or a theoretical molecular weight calculated from the ratio of raw materials prepared at the time of producing the compound is adopted. The molecular weight of the component D is 500 or more, may be 510 or more, 520 or more, 550 or more, 570 or more, 600 or more, 630 or more or 650 or more. From the viewpoint of increasing the degree of curing of the photochromic layer, the molecular weight of the component D may be, for example, 2000 or less, 1500 or less, 1200 or less, 1000 or less or 800 or less.

Further, in one form, the polymerizable composition for forming the photochromic layer may contain the following component E.

The component E is a (meth)acrylate having a molecular weight of 400 or less and represented by the following formula 2:

(Formula 2)

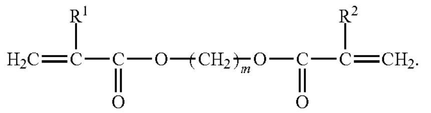

In the formula (2), $R^1$ and $R^2$ each independently represent a hydrogen atom or a methyl group, and m represents an integer of 1 or more. m is 1 or more and may be, for example, 10 or less, 9 or less, 8 or less, 7 or less or 6 or less.

The molecular weight of the component E is 400 or less, may be 350 or less, 300 or less or 250 or less from the viewpoint of further increasing the color optical density of the photochromic layer. Further, the molecular weight of the component E may be, for example, 100 or more, 150 or more or 200 or more.

As a (meth)acryloyl group, the component E may contain only an acryloyl group, may contain only a methacryloyl group or may contain an acryloyl group and a methacryloyl group. In one form, the component B may contain only an acryloyl group as the (meth)acryloyl group. Specific examples of the component E may include 1,9-nonanediol diacrylate, 1,6-hexanediol diacrylate, 1,10-decanediol diacrylate and the like.

The composition may contain, as the polymerizable compound, only the component D and the component E in one form or may contain, in addition to the component D and the component E, one or more different polymerizable compounds in another form Hereinafter, the different polymerizable compounds that may be contained in the composition will be exemplified.

The polymerizable composition for forming the photochromic layer may also contain a component F exemplified below in one form. The component F is capable of contributing to improvement in the performance, such as application suitability, of the composition without significantly affecting the coloring property of the photochromic layer formed of the composition upon light irradiation and the visible light transmission property in the absence of irradiation.

The component F is an acyclic tri- or higher functional (meth)acrylate. The component F may be a tri- to pentafunctional (meth)acrylate, may be a trifunctional or tetrafunctional (meth)acrylate or may be a trifunctional (meth) acrylate. Specific examples of the component F may include pentaerythritol tri(meth)acrylate, pentaerythritol tetra(meth) acrylate, dipentaerythritol tetra(meth)acrylate, trimethylolethane tri(meth)acrylate, trimethylolpropane tri(meth)acrylate, ditrimethylolpropane tetra(meth)acrylate, tetramethylolmethane tetra(meth)acrylate, tetramethylolmethane tri(meth)acrylate and the like. The molecular weight of the component F may be, for example, within a range of 200 to 400, but is not limited to this range. As a (meth)acryloyl group, the component C may contain only an acryloyl group, may contain only a methacryloyl group or may contain an acryloyl group and a methacryloyl group. In one aspect, the acyclic tri- or higher functional (meth) acrylate may contain only a methacryloyl group as the (meth)acryloyl group, that is, methacrylate.

In one form, the polymerizable composition for forming the photochromic layer may contain, as the polymerizable compound, one or more different polymerizable compounds other than the above-described components. In the polymerizable composition for forming the photochromic layer, when the total amount of the polymerizable compounds contained in the composition is regarded as 100% by mass, the content rate of the component D may be 50.0% by mass or more, 55.0% by mass or 60.0% by mass or more. In one form, the component D may be, among the plurality of polymerizable compounds contained in the composition, a component having the largest fraction. Further, when the total amount of the polymerizable compounds contained in the composition is regarded as 100% by mass, the content rate of the component D may be 90.0% by mass or less, 85.0% by mass or less, 80.0% by mass or less or 75.0% by mass or less.

According to the present inventors' studies, regarding the component E, a tendency for the color optical density when the photochromic layer has colored upon light irradiation to increase as the content rate of the component E increases is shown. On the other hand, according to the present inventors' studies, a tendency for the fading speed, which is one of indexes indicating optical responsivity, to become slower as the content rate of the component E increases is also shown. From the viewpoint of the color optical density, when the total amount of the polymerizable compounds contained in the composition is regarded as 100% by mass, the content rate of the component E may be 5.0% by mass or more, 10.0% by mass or more or 15.0% by mass or more. From the viewpoint of the optical responsivity, when the total amount of the polymerizable compounds contained in the composition is regarded as 100% by mass, the content rate of the component E may be 30.0% by mass or less or 25.0% by mass or less.

Regarding the component F, the content rate of the component F may be, with respect to the total amount of the polymerizable compounds contained in the polymerizable composition for forming the photochromic layer, 0% by mass and can be 0% by mass or more, more than 0% by mass, 1.0% by mass or more, 3.0% by mass or more, 5% by mass or more or 7% by mass or more. The content rate of the component F may be, with respect to the total amount of the polymerizable compounds contained in the composition, 20.0% by mass or less or 15.0% by mass or less.

Regarding the component C, the content rate of the component C may be, with respect to the total amount of the polymerizable compounds contained in the polymerizable composition for forming the photochromic layer, 0% by mass and can be 0% by mass or more, more than 0% by mass, 1.0% by mass or more, 3.0% by mass or more, 5 0% by mass or more or 7.0% by mass or more. The content rate of the component C may be, with respect to the total amount of the polymerizable compounds contained in the polymerizable composition for forming the photochromic layer, 20.0% by mass or less or 15.0% by mass or less.

When the total amount of the polymerizable composition for forming the photochromic layer is regarded as 100% by mass, the content rate of the polymerizable compounds in the composition may be, for example, 80.0% by mass or more, 85.0% by mass or more or 90.0% by mass or more. Further, when the total amount of the polymerizable composition for forming the photochromic layer is regarded as 100% by mass, the content rate of the polymerizable compounds in the composition may be, for example, 99.0% by mass or less, 95.0% by mass or less, 90.0% by mass or less or 85.0% by mass or less.

(Photochromic Compound)

The polymerizable composition for forming the photochromic layer contains a photochromic compound together with the polymerizable compounds. As the photochromic compound contained in the polymerizable composition for forming the photochromic layer, a known compound exhibiting photochromic properties can be used. The photochromic compound is capable of exhibiting photochromic properties to, for example, ultraviolet rays. Examples of the photochromic compound may include compounds having a known skeleton exhibiting photochromic properties such as a fulgimide compound, a spirooxazine compound, a chromene compound and an indeno-fused naphthopyran compound. The photochromic compound can be used singly or two or more photochromic compounds can also be used in a mixture form. When the total amount of the composition is regarded as 100% by mass, the content rate of the photochromic compound in the polymerizable composition for forming the photochromic layer may be set to, for example, about 0.1 to 15.0% by mass, but is not limited to this range.

(Other Components)

The polymerizable composition for forming the photochromic layer may contain, in addition to the polymerizable compounds and the photochromic compound, one or more of various additives that can be generally contained in the polymerizable composition at any content rate. As the additives that can be generally contained in the polymerizable composition for forming the photochromic layer, for example, a polymerization initiator for progressing a polymerization reaction can be exemplified. Regarding the polymerization initiator, the above description can be referred to. When the total amount of the composition is regarded as 100% by mass, the content rate of the polymerization initiator may be, for example, within a range of 0.1 to 5.0% by mass.

To the polymerizable composition for forming the photochromic layer, it is possible to further add, at any amount, known additives that can be generally added to the composition containing the photochromic compound, for example, a surfactant, an antioxidant, a radical scavenger, a light stabilizer, an ultraviolet absorber, an anti-coloring agent, an antistatic agent, a fluorescent dye, a dye, a pigment, a perfume, a plasticizer, a silane coupling agent and the like. As these additives, known compounds can be used.

The polymerizable composition for forming the photochromic layer can be prepared by mixing the above-described various components at the same time or sequentially in any order.

The photochromic layer can be formed by applying the polymerizable composition for forming the photochromic layer onto the primer layer and performing a curing treatment on the applied composition. Regarding an application method, the above description can be referred to. The curing treatment may be light irradiation and/or a heating treatment and may be light irradiation from the viewpoint of progressing a curing reaction within a short period of time. The conditions for the curing treatment may be determined depending on the types of various components contained in the composition (the polymerizable compounds, the polymerization initiator and the like described above) or the composition of the composition. The thickness of the photochromic layer to be formed as described above may be, for example, within a range of 5 μm to 80 μm or within a range of 20 μm to 60 μm. The substrate and the primer layer may be adjacent to each other, and the primer layer and the photochromic layer may be adjacent to each other. Here, "adjacent" means that the components are in direct contact with each other without any layer therebetween.

The optical article having the photochromic layer may or may not further have, in addition to the above-described various layers, one or more functional layers. Examples of the functional layers may include known layers as functional layers for optical articles such as a protective layer, an antireflection layer, a water repellent or hydrophilic antifouling layer and an antifogging layer, which are intended to improve the durability of the optical article.

An aspect of the optical article is a spectacle lens. Further, as an aspect of the optical article, a goggle lens, a visor portion of a sun visor, a shield member of a helmet and the like can be exemplified. The above-described composition is applied onto a substrate for these optical articles, and a curing treatment is performed on the applied composition to form a photochromic layer, whereby an optical article having an anti-glare function can be obtained.

[Spectacles]

Another aspect of the present disclosure relates to spectacles having the spectacle lenses, which are an aspect of the optical article. Details of the spectacle lenses of the spectacles are as described above. The spectacles have such spectacle lenses and are thus capable of, for example, outdoors, exhibiting an anti-glare effect like sunglasses due to the photochromic compound contained in the photochromic layer being irradiated with sunlight and coloring and capable of recovering the transmission property due to the photochromic compound fading when brought back indoors. Regarding the spectacles, a known technique may be applied to the configuration of a frame and the like.

EXAMPLES

Hereinafter, the present disclosure will be further described using examples. However, the present disclosure is not limited to embodiments described in the examples.

[Spectacle Lens A]

<Manufacturing of Spectacle Lens>

A plastic lens substrate (trade name EYAS manufactured by HOYA Corporation; central wall thickness 2.5 mm, radius 75 mm, S-4.00) was immersed in a 10% by mass sodium hydroxide aqueous solution (liquid temperature 60° C.) for 5 minutes, then cleaned with pure water and dried. After that, a primer layer was formed on the convex surface (object-side surface) of this plastic lens substrate. In detail, a hydroxyl group-containing bifunctional acrylate (10 parts by mass) having the following structure:

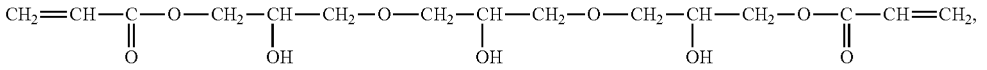

which was a component B, was mixed with CORONATE 2715 (40 parts by mass) manufactured by Tosoh Corporation as a polyisocyanate, which was a component A, and 2-phenoxyethyl acrylate (viscosity: 13 cP) (50 parts by mass), which was a component C. With the mixture obtained as described above, a photoradical polymerization initiator (bis(2,4,6-trimethylbenzoyl)phenylphosphine oxide (Omnirad819 manufactured by IGM Resin B.V.)) was mixed in an amount of 0.02% by mass with respect to a total of 100% by mass of the mixture and sufficiently stirred. After that, the mixture was defoamed with a rotation-revolution type stirring and defoaming apparatus.

A polymerizable composition for forming the primer layer obtained as described above was applied to the convex surface of the plastic lens substrate by a spin coating method in an environment of a temperature of 25° C. and a relative humidity of 50%, then, the composition for forming the primer layer applied to the plastic lens substrate was irradiated with ultraviolet rays (wavelength 405 nm) in a nitrogen atmosphere (oxygen concentration 500 ppm or less), and this composition was cured to form a primer layer. The thickness of the formed primer layer was 8 μm.

Next, an annealing treatment (heating treatment) was performed on a laminate of the primer layer and the substrate for 2 hours in a heating furnace at an atmospheric temperature of 90° C., and then a coating composition for forming a photochromic layer prepared as described below was applied onto the primer layer by the spin coating method. The spin coating was performed by a method described in Japanese Patent Application Laid-Open No. 2005-218994. After that, the composition applied onto the plastic lens substrate was irradiated with ultraviolet rays (wavelength 405 nm) in a nitrogen atmosphere (oxygen concentration 500 ppm or less), and this composition was cured to form a photochromic layer. The thickness of the formed photochromic layer was 25 μm.

A spectacle lens A having the photochromic layer was manufactured.

<Preparation of Polymerizable Composition for Forming Photochromic Layer>

In a plastic container, 61.2 parts by mass of polyethylene glycol dimethacrylate (in the formula 2, n=14, R is an ethylene group, molecular weight 736), which was a component D, 18.0 pats by mass of 1,9-nonanediol diacrylate (in the formula 2, $R^1$ and $R^2$ are hydrogen atoms, m=9, molecular weight 268), which was a component E, 10.8 parts by mass of trimethylolpropane trimethacrylate (molecular weight 296), which was a component F, and 10.0 parts by mass of 2-phenoxyethyl acrylate (viscosity 13 cP), which was a component C, were mixed together.

With the mixture of the polymerizable compounds obtained as described above, a photochromic compound (indeno-fused naphthopyran compound represented by a structural formula shown in the specification of U.S. Pat. No. 5,645,767), a photoradical polymerization initiator (bis (2,4,6-trimethylbenzoyl) phenylphosphine oxide (Omnirad819 manufactured by IGM Resin B.V.)), an antioxidant (bis[3-(3-tert-butyl-4-hydroxy-5-methylphenyl)propionate] [ethylenebis(oxyethylene)]) and a light stabilizer (bis(1,2,2,6,6-pentamethyl-4-piperidyl) sebacate) were mixed and sufficiently stirred. After that, the mixture was defoamed with a rotation-revolution type stirring and defoaming apparatus. A polymerizable composition for forming a photochromic layer was prepared as described above. When the total amount of the composition was regarded as 100% by mass, the content rates of the above-described components are 94.90% by mass for the mixture of the polymerizable compounds, 3.00% by mass for the photochromic compound, 0.30% by mass for the photoradical polymerization initiator, 0.90% by mass for the antioxidant and 0.90% by mass for the light stabilizer. In the polymerizable composition for forming a photochromic layer prepared here, when the total amount of the polymerizable compounds was regarded as 100% by mass, the content rate of the component D is 61.2% by mass, the content rate of the component E is 18.0% by mass, the content rate of the component F is 10.8% by mass and the content rate of the component C is 10.0% by mass.

[Spectacle Lens B]

In the preparation of a composition for forming a primer layer, a hydroxy group-containing bifunctional acrylate having the above-shown structure (27.5 parts by mass), which was a component B, CORONATE 2715 (25.0 parts by mass) manufactured by Tosoh Corporation as a polyisocyanate, which was a component A and propylene glycol monomethyl ether acetate (27.5 parts by mass), which was added instead of using a component C, were mixed together. A spectacle lens B was obtained in the same manner as in the manufacturing of the spectacle lens A except this point.

[Evaluation of Optical Homogeneity]

The spectacle lens A and the spectacle lens B were observed with an optical microscope under irradiation with highly bright light emitted from a zircon lamp in a dark room. In the spectacle lens B, a plurality of optical defects of about several tens of micrometers was confirmed, but such optical defects were not shown in the spectacle lens A. That is, the spectacle lens A was superior to the spectacle lens B in terms of the optical homogeneity.

<Evaluation of Adhesive Property>

For the spectacle lens A, the adhesive property was evaluated by a cross-cut method according to JIS K 5600-5-6: 1999. The evaluation result was "the number of remaining squares/the total number of squares" was "100/100", and it was confirmed that the spectacle lens A was excellent in terms of the adhesive property between the substrate and the photochromic layer.

As a result of immersing the spectacle lens A in warm water of 100° C. for 30 minutes and then evaluating the adhesive property by the cross-cut method in the same manner as in the above-described method, "the number of remaining squares/the total number of squares" was "100/100".

Finally, the above-described individual aspects will be summarized.

According to one aspect, there is provided an optical article having a substrate, a primer layer generated by curing a polymerizable composition for forming the primer layer, and a photochromic layer containing a photochromic compound in this order, in which the polymerizable composition for forming the primer layer contains the component A, the component B and the component C.

The optical article may be an optical article having excellent optical homogeneity.

In one form, the content rate of the component C of the polymerizable composition for forming the primer layer may be, with respect to the total of the component A, the component B and the component C, 30.0% by mass or more and 90.0% by mass or less.

In one form, in the polymerizable composition for forming the primer layer, the component C may be, among the component A, the component B and the component C, a component having the largest fraction.

In one form, the number of the hydroxy groups contained in one molecule of the component B may be 2 or more.

In one form, the component B may be a hydroxy group-containing (meth)acrylate.

In one form, the component B may be a bi- or higher functional (meth)acrylate.

In one form, the optical article may be a spectacle lens.

In one form, the optical article may be a goggle lens.

In one form, the optical article may be a visor portion of a sun visor.

In one form, the optical article may be a shield member of a helmet.

According to one aspect, there are provided spectacles having the above-described spectacle lenses.

Two or more of the various aspects and forms described in the present specification can be combined in any combination.

The embodiment disclosed this time should be considered to be exemplary in all respects and not restrictive. The scope of the present disclosure is defined not by the description above but by the claims, and is intended to include all modifications within the meaning and scope equivalent to the claims.

The present disclosure is useful in the technical fields of spectacles, goggles, sun visors, helmets and the like.

What is claimed is:

1. An optical article that is a spectacle lens, the spectacle lens comprising:

a substrate;

a primer layer generated by curing a polymerizable composition for forming the primer layer; and a photochromic layer containing a photochromic compound in this order, wherein the polymerizable composition for forming the primer layer consists essentially of a component A: a polyisocyanate, a component B: a hydroxy group-containing polymerizable compound, a component C: a polymerizable compound having a viscosity of 100 cP or less and being selected from the group consisting of (meth)acrylates and vinyl ethers, and a polymerization initiator.

2. The optical article according to claim 1, wherein a content rate of the component C of the polymerizable composition for forming the primer layer is, with respect to a total of the component A, the component B and the component C, 30.0% by mass or more and 90.0% by mass or less.

3. The optical article according to claim 1, wherein, in the polymerizable composition for forming the primer layer, the component C is, among the component A, the component B and the component C, a component having a largest fraction.

4. The optical article according to claim 1, wherein the number of the hydroxy groups contained in one molecule of the component B is 2 or more.

5. The optical article according to claim 1, wherein the component B is a hydroxy group-containing (meth)acrylate.

6. The optical article according to claim 5, wherein the component B is a bi- or higher functional (meth)acrylate.

7. Spectacles comprising:

the spectacle lens according to claim 1.

* * * * *